Patented June 23, 1936

2,044,817

UNITED STATES PATENT OFFICE 2,044,817

REFRACTORY

Frederic William Schroeder, Mexico, Mo., assignor to Corhart Refractories Company, Louisville, Ky., a corporation of Delaware No Drawing. Application July 31, 1934, Serial No. 737,830

1 Claim. (Cl. 13—36)

In United States Patent No. 1,615,750 is described a cast refractory consisting of mullite and corundum crystals embedded in a glassy matrix. Such refractories have been commercially made and used in the United States for several years past and have met with great success especially for the melting of glass; it has been thought that best results would be obtained by reducing as far as possible the alkalies present in the refractories. In pursuance of this belief expensive raw materials, as free as possible from alkalies, were used when the best results were sought, even at a considerable expense for the raw materials. When the conditions were not as exacting cheaper materials were employed containing larger percentages of alkali but as a rule the manufacture of the refractories in question has resulted in a considerable loss due to the cracking of the refractories during the cooling operations subsequent to their casting.

I have discovered that a certain and cheaply obtainable percentage of alkalies is desirable with refractories containing silica and alumina when the alumina is in excess of that present in mullite in that such percentage of alkali permits the cooling of the cast blocks with a loss due to cracking less than that which occurs when the percentage of alkalies is either greater or less than the desirable percentage.

I find the desirable alkali contents of refractories, such as above considered, range from 0.85% to 1.42%.

The analytical composition of a specific refractory falling within this invention is here given by way of example but not of limitation.

| | |
|---|---|
| $SiO_2$ | 20.44 |
| $Al_2O_3$ | 74.31 |
| $Fe_2O_3$ | 0.30 |
| $TiO_2$ | 3.55 |
| CaO | 0.19 |
| MgO | 0.20 |
| Alkalies | 1.03 |

In the above refractory the alumina may vary from 68 to 75 and the silica from 19 to 22%, without materially changing the results obtained.

Having thus described my invention what I claim as new and desire to secure by United States Letters Patent, is:

An aluminous fused and cast refractory having an ultimate analysis of 68 to 75% alumina, 19 to 22% silica and 0.85 to 1.42% alkali.

FREDERIC WILLIAM SCHROEDER.